United States Patent [19]

Maeda et al.

[11] Patent Number: 5,294,696

[45] Date of Patent: Mar. 15, 1994

[54] PROCESS FOR PRODUCING POLYISOIMIDE

[75] Inventors: Hirotoshi Maeda, Kanagawa; Kouichi Kunimune, Chiba, both of Japan

[73] Assignee: Chisso Corporation, Osaka, Japan

[21] Appl. No.: 804,710

[22] Filed: Dec. 11, 1991

[30] Foreign Application Priority Data

Dec. 14, 1990 [JP] Japan .................. 2-410596

[51] Int. Cl.⁵ .................. C08G 73/10; C08G 69/26
[52] U.S. Cl. .................. 528/353; 528/26; 528/33; 528/34; 528/38; 528/125; 528/128; 528/170; 528/173; 528/179; 528/183; 528/185; 528/188; 528/220; 528/229; 528/350; 528/351
[58] Field of Search .................. 525/420, 436; 528/125, 528/128, 26, 33, 34, 38, 170, 173, 179, 183, 185, 188, 220, 229, 351, 353, 350

[56] References Cited

U.S. PATENT DOCUMENTS

| | | | |
|---|---|---|---|
| 3,271,366 | 9/1966 | Kreuz | 528/353 |
| 3,282,898 | 11/1966 | Angelo | 528/353 |
| 3,947,402 | 3/1992 | Volkommer et al. | 260/30.2 |
| 4,438,273 | 3/1984 | Landis | 528/128 |
| 4,699,803 | 10/1987 | Araps et al. | 437/243 |
| 5,096,999 | 3/1992 | Hellmut et al. | 528/176 |

OTHER PUBLICATIONS

Derwent Publication Ltd., London, GB; AN89-170548 of Japanese Patent Application Nos. JP-A-1 113 434.

Derwent Publication Ltd., London, GB; AN 86-207382 of Japanese Patent Application No. JP-A-61 138 629. CA 114(20): 186360t.

*Primary Examiner*—Morton Foelak
*Assistant Examiner*—P. Hampton-Hightower
*Attorney, Agent, or Firm*—Leydig, Voit & Mayer

[57] ABSTRACT

The present invention provides a dehydrating agent which is less poisonous and which can be easily handled in producing a polyisoimide by dehydrating a polyamic acid. A process is also provided for producing a polyisoimide without requiring the separation of by-products.

That is, the process for producing the polyisoimide of the present invention includes the step of using a dihyroquinoline derivative represented by the formula

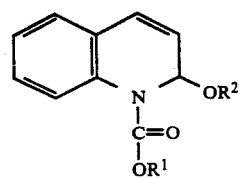

(1)

(wherein each $R^1$ and $R^2$ is independently a monovalent organic group having 1 to 8 carbon atoms) as the dehydrating agent in producing the polyisoimide by dehydrating the polyamic acid.

18 Claims, 2 Drawing Sheets

PROCESS FOR PRODUCING POLYISOIMIDE

BACKGROUND OF THE INVENTION (i) Field of the Invention

The present invention relates to a process for producing a polyisoimide.

(ii) Description of the Related Art

It is well known that a polyisoimide can be manufactured by the action of a dehydrating agent on a polyamic acid. For example, in Japanese Patent Application Laid-open Nos. 60-170683, 61-254547, 63-118329, 63-118330 and 63-223746, Japanese Patent Disclosure Nos. 61-500851 and 61-500997, and U.S. Pat. Nos. 3,271,366, 3,282,898 and 4,699,803, there are used, as dehydrating agents, an N,N'-dihydrocarbyl-substituted carbodiimide such as dicyclohexylcarbodiimide (hereinafter referred to as "DCC"), a halogenated lower fatty acid anhydride such as trifluoroacetic acid anhydride, and a lower fatty acid halide such as thionyl chloride or acetyl chloride.

However, in the case that N,N'-dihydrocarbyl-substituted carbodiimide is used, a urea compound which is insoluble in the solvent used is formed as a by-product by a dehydration reaction. Therefore, it is necessary to separate the urea compound which is the by-product, which complicates the manufacturing process Furthermore, the halogenated lower fatty acid anhydride and the lower fatty acid halide as well as the above-mentioned N,N'-dihydrocarbyl-substituted carbodiimide are very poisonous, and hence much attention must be paid to the handling of these dehydrating agents.

SUMMARY OF THE INVENTION

An object of the present invention is to provide a dehydrating agent which is less poisonous and which can be easily handled in producing a polyisoimide by dehydrating a polyamic acid, and another object of the present invention is to provide a process for producing a polyisoimide without requiring the separation of by-products.

The present inventors have repeatedly researched dehydration reactions of polyamic acids, and as a result, they have found a dehydrating agent which is less poisonous and which controls the production of by-products. In consequence, a process for producing a polyisoimide of the present invention has been completed. That is, a process for producing a polyisoimide according to the present invention is characterized by using a dihyroquinoline derivative represented by the formula

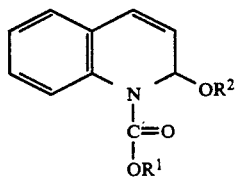

(1)

(wherein each $R^1$ and $R^2$ is independently a monovalent organic group having 1 to 8 carbon atoms) as a dehydrating agent in producing the polyisoimide by dehydrating a polyamic acid.

DETAILED DESCRIPTION OF THE INVENTION

Figure 1:
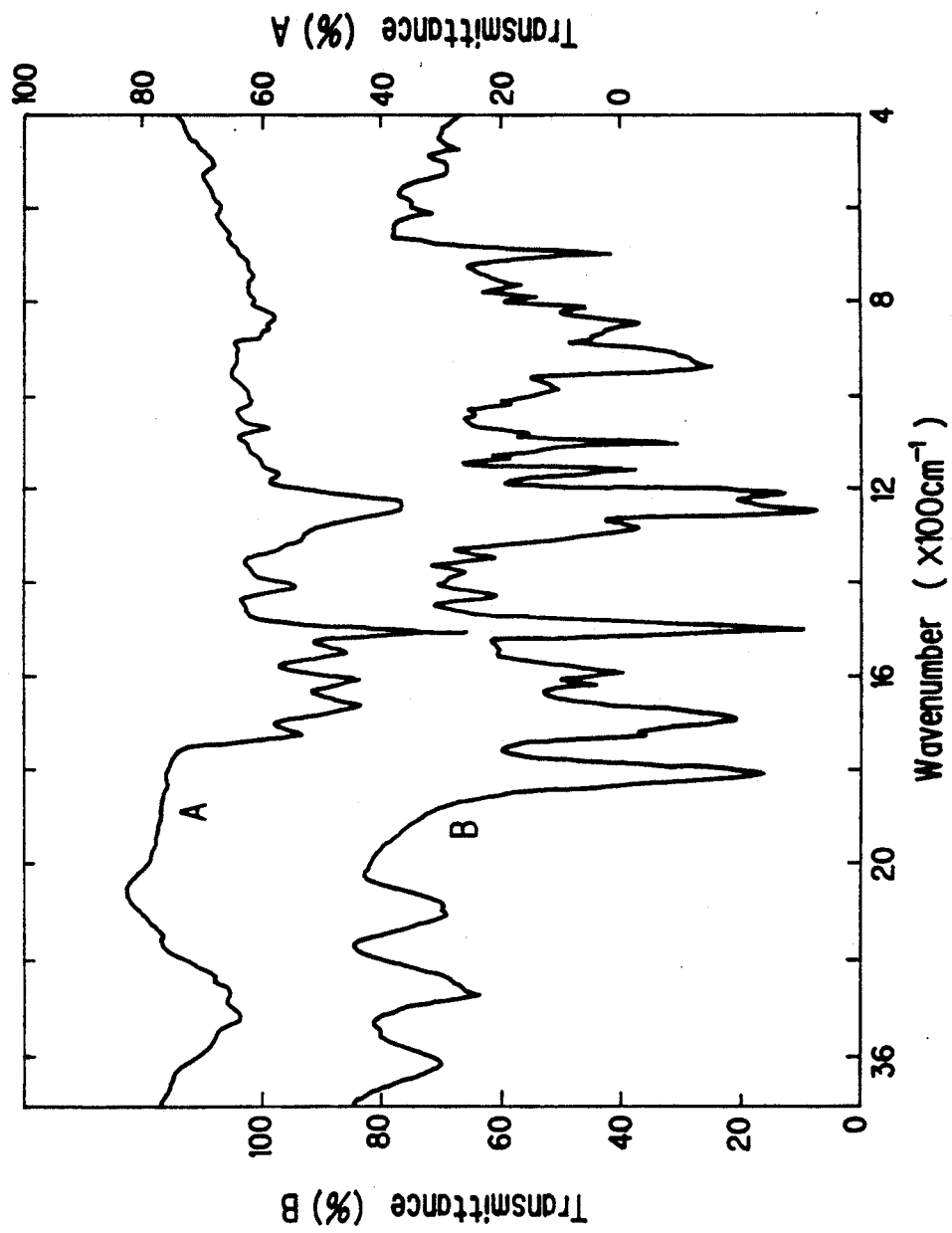
FIG. 1 shows infrared absorption spectra, wherein curve A is the infrared absorption spectrum of a polyamic acid and the curve B is the infrared absorption spectrum of a polyisoimide.

A polyamic acid which can be used in the present invention is an organic solvent-soluble compound represented by the formula

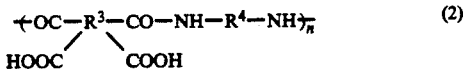

(wherein $R^3$ is a tetravalent organic group, $R^4$ is a divalent organic group, and n is a positive integer).

A dihyroquinoline derivative which can be used in the process of the present invention is represented by the formula (1). Typical examples of the dihyroquinoline derivative include but are not limited to N-methoxycarbonyl-2-methoxy-1,2-dihydroquinoline, N-methoxycarbonyl-2-ethoxy-1,2-dihydroquinoline, N-ethoxycarbonyl-2-methoxy-1,2-dihydroquinoline, N-ethoxycarbonyl-2-ethoxy-1,2-dihydroquinoline, N-propoxycarbonyl-2-propoxy-1,2-dihydroquinoline, N-isobutoxycarbonyl-2-methoxy-1,2-dihydroquinoline, N-isobutoxycarbonyl-2-ethoxy-1,2-dihydroquinoline, N-isobutoxycarbonyl-2-isobutoxy-1,2-dihydroquinoline and N-pentoxycarbonyl-2-pentoxy-1,2-dihydroquinoline.

According to the process of the present invention, the dihydroquinoline derivative is added to a solution formed by dissolving the polyamic acid in an organic solvent, thereby obtaining a polyisoimide. This reaction is as follows.

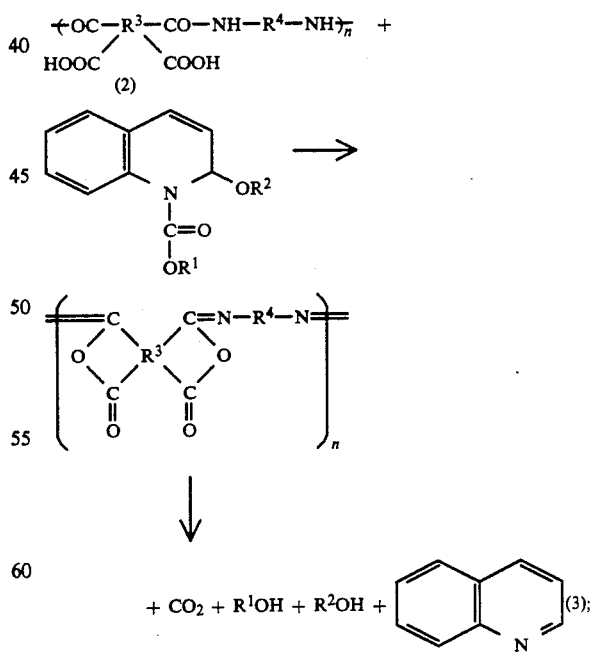

(wherein $R^1$, $R^2$, $R^3$ and $R^4$ are as defined above).

Carbon dioxide which is a by-product is removed in the state of a gas from the system, and an alcohol and quinoline are dissolved in the solvent and so it is not necessary to remove them on purpose. A reaction temperature is from 0 to 100° C, preferably from 10 to 50° C. With regard to the amount of the dihydroquinoline derivative which is added to the polyamic acid, the dihydroquinoline derivative is added in an amount of two molecules thereof with respect to one repeating unit of amic acid, and in this case, all of the polyamic acid can be theoretically converted into the polyisoimide. However, the dihydroquinoline derivative can be used in an excessive amount without any problem, and it can also be used in a small amount but in such a case, a polymer is obtained in which the isoimide repeating units and the amic acid repeating units are present together. Depending upon reaction conditions, the produced isoimide is partially converted into an imide, and as a result, a polymer containing the imide, the isoimide and the amic acid repeating units is produced on occasion.

The thus obtained polyisoimide solution is then applied, as a coating solution, onto substrates such as glass plates, copper plates, aluminum plates or silicon wafers, and it is then calcined at a temperature of from 150 to 400° C, whereby the cured film of a polyimide represented by the following reaction formula can be obtained:

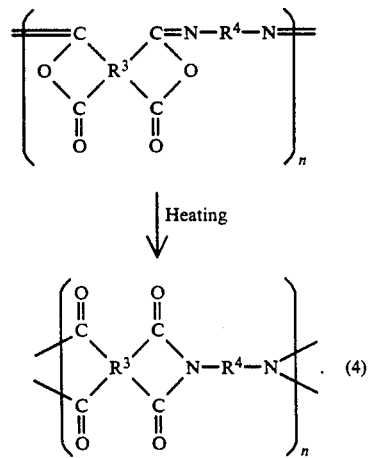

(wherein $R^3$ and $R^4$ are as defined above).

Furthermore, when a compound having an active hydrogen such as an amine, a carboxylic acid or an alcohol is added to a solution containing the polyisoimide obtained by the process of the present invention and when suitable reaction conditions are maintained, various industrially useful compounds can be obtained.

In the process of the present invention, the polyamic acid can usually be synthesized by reacting a tetracarboxylic acid dianhydride with a diamine in the organic solvent.

Examples of the tetracarboxylic acid dianhydride include the following compounds, but they are not always limited.

Typical examples of the tetracarboxylic acid dianhydride include aromatic tetracarboxylic acid dianhydrides such as pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, bis(3,4-dicarboxylyphenyl) ether dianhydride, bis(3,4-dicarboxylphenyl)sulfone dianhydride, 1,2,5,6-naphthalenetetracarboxylic acid dianhydride, 2,3,6,7-naphthalenetetracarboxylic acid dianhydride and 2,2-bis(3,4-dicarboxyphenyl)hexafluoropropane dianhydride; alicyclic tetracarboxylic acid dianhydrides such as cyclobutanetetracarboxylic acid dianhydride and methylcyclobutanetetracarboxylic acid dianhydride; and an aliphatic tetracarboxylic acid dianhydride such as 1,2,3,4-tetracarboxybutane dianhydride.

Examples of the diamine include the following compounds, but they are not limited thereto. Typical examples of the diamine include aromatic diamines such as 4,4'-diamino diphenyl ether, 4,4'-diaminodiphenylmethane, 4,4'-diaminodiphenylsulfone, 3,3'-diaminodiphenylsulfone, 4,4'-diaminodiphenyl sulfide, 4,4'-di(meta-aminophenoxy)diphenylsulfone, 4,4'-di(para-aminophenoxy)diphenylsulfone, ortho-phenylenediamine, meta-phenylenediamine, para-phenylenediamine, benzidine,3,3'-diaminobenzophenone, 4,4'-diaminobenzophenone, 4,4'-diaminodiphenyl-2,2'-propane, 1,5-diaminonaphthalene, 1,8-diaminonaphthalene, 3,4'-diamino diphenyl ether, 4,4'-bis(4-aminophenoxy)-biphenyl, 2,2-bis[4-(4-aminophenoxy)phenyl]hexafluoropropane, 1,4-bis(4-aminophenoxy)benzene, 1,3-bis(4-aminophenoxy)benzene, 1,3-bis(3-aminophenoxy)-benzene, 4,4'-diamino-3,3'-diethyl-5,5'-dimethyldiphenylmethane, 4,4'-diamino-3,3',5,5'-tetramethyldiphenylmethane, 1,4-diaminotoluene, meta-xylylenediamine and 2,2'-dimethylbenzidine; aliphatic diamines such as trimethylenediamine, tetramethylenediamine, hexamethylenediamine, 4,4-dimethylheptamethylenediamine and 2,11-dodecadiamine; silicon diamines such as bis(p-aminophenoxy)dimethylsilane and 1,4-bis(3-aminopropyldimethylsilyl)benzene; alicyclic diamines such as 1,4-diaminocyclohexane, bis(4-aminocyclohexyl)methane and isophoronediamine; and guanamines such as acetoguanamine and benzoguanamine.

Examples of a diaminopolysiloxane include the following compounds:

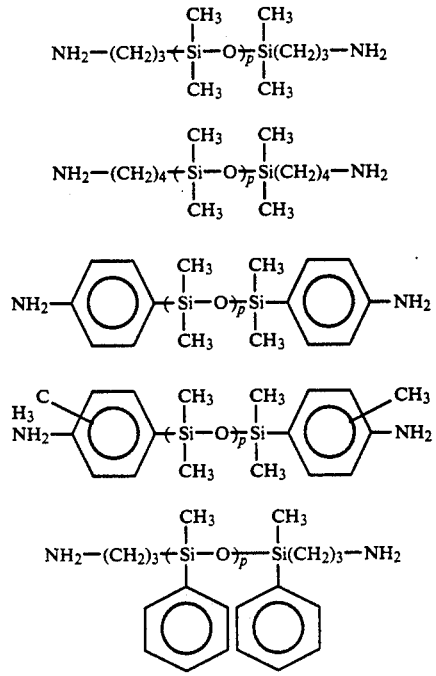

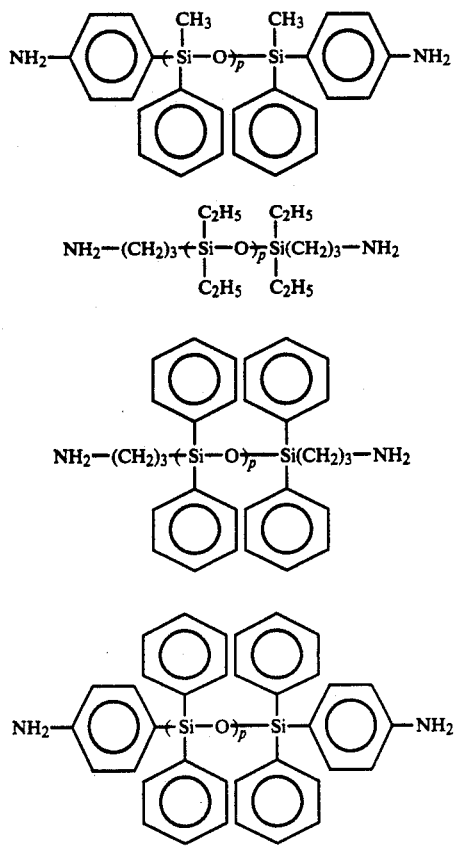

(wherein p is a value of from 1 to 100).

In the process of the present invention, preferable examples of the solvent (hereinafter referred to as "reaction solvent" at times) for the synthesis of the polyamic acid by the reaction of a tetracarboxylic acid dianhydride and a diamine include N-methyl-2-pyrrolidone, N,N-dimethylacetamide, N,N-dimethylformamide, dimethyl sulfoxide, tetramethylurea, pyridine, hexamethylphosphoramide, methylformamide, N-acetyl-2-pyrrolidone, 2-methoxyethanol, 2-ethoxyethanol, 2-butoxyethanol, diethylene glycol monomethyl ether, diethylene glycol monoethyl ether, diethylene glycol monobutyl ether, cyclopentanone, cyclohexanone, cresol, Υ-butyrolactone, isophorone, N,N-diethylacetamide, N,N-diethylformamide, N,N-dimethylmethoxyacetamide, tetrahydrofuran, N-acetyl-2-pyrrolidone, N-methyl-ε-caprolactam, tetrahydrothiophene dioxide and sulpholane. Moreover, the above-mentioned reaction can also be carried out in a mixed solvent which can be obtained by mixing two or more of these organic solvents. In addition, the above-mentioned preferable organic solvent can be diluted with another non-protonic (neutral) organic solvent such as an aromatic, alicyclic or aliphatic hydrocarbon, its chlorinated derivative (e.g., benzene, toluene, xylene, cyclohexane, pentane, hexane, petroleum ether or methylene chloride), or dioxane.

The process of the present invention utilizes the dihydroquinoline derivative, and therefore the industrially useful polyisoimide can be prepared more easily and more safely as compared with conventional methods. Furthermore, since the reaction solution is uniform and free from corrosive compounds such as halogens, the removal of byproducts is not required. Accordingly, the reaction solution can be used directly as a coating solution.

EXAMPLES

Now, the present invention will be described in more detail with reference to examples, but the scope of the present invention should not be limited by these examples.

EXAMPLE 1

A 1-liter flask equipped with a stirrer, a dropping funnel, a thermometer, a condenser and a nitrogen replacement device was fixed in cold water. The atmosphere in the flask was then replaced with a nitrogen gas. Afterward, 500 g of dehydrated and purified N-methyl-2-pyrrolidone (hereinafter referred to simply as "NMP"), 21.92 g (0.109 mol) of 4,4'-diamino diphenyl ether and 35.28 g (0.109 mol) of 3,3',4,4'-benzophenonetetracarboxylic acid dianhydride were placed in the flask, and reaction was then carried out at a temperature of from 20° to 30° C. for 5 hours to obtain a polyamic acid solution. The logarithmic viscosity number of this polyamic acid was 1.2 dl/g.

Next, 43.13 g (0.17 mol) of N-ethoxycarbonyl-2-ethoxy-1,2-dihyroquinoline (hereinafter referred to simply as "EEDQ") was added to this solution, and reaction was then carried out at a temperature of from 10° to 20° C. for 3 hours, whereby carbon dioxide gas was generated vigorously, and a yellow and transparent solution containing a polyisoimide having a logarithmic viscosity number of 1.3 was obtained.

Silicon wafers were spin-coated with each of the previously sampled polyamic acid solution and the polyisoimide solution, and each of the solutions on the wafers was dried at ordinary temperature under reduced pressure to form a film of the polyamic acid and a film of the polyisoimide on the silicon wafers. Parts of these films were peeled from the wafers, and infrared absorption spectra were then measured for the parts of the films. The results are shown with FIG. 1A (polyamic acid) and FIG. 1B (polyisoimide).

Figure 2:
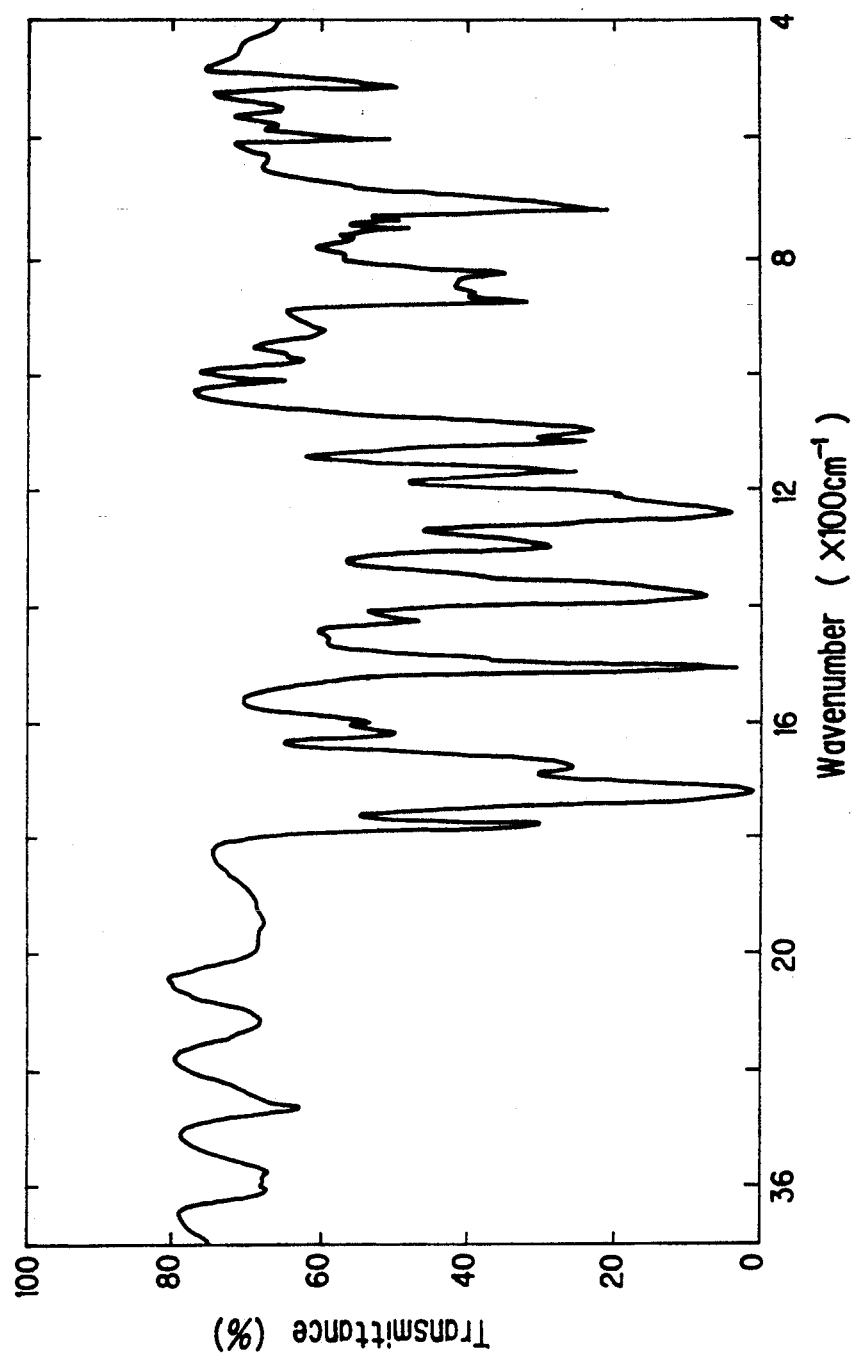
FIG. 2 shows the infrared absorption spectrum of a polyimide.

Furthermore, the polyisoimide film was calcined at 350° C. for 1 hour in an oven to form a polyimide film, and the infrared absorption spectra of the polyimide film were shown in FIG. 2 (polyimide). FIG. 1A was compared with FIG. 1B. In FIG. 1B, the absorption of the isoimide appeared at 1800cm$^{-1}$, and thus it is definite that the polyisoimide was produced by the process of the present invention. In addition, as shown in FIG. 2, it is perceived that the polyisoimide was converted into the polyimide by the calcination.

In the present invention, the logarithmic viscosity number ($\eta_{inh}$) can be defined by the formula $$\eta_{inh} = \frac{\ln \eta/\eta_o}{C}$$

(wherein $\eta$ is a value obtained by measuring a polyamic acid having a concentration of 0.5 g/cl in a solvent having the same composition as in the polymerization solvent at a temperature of 30±0.01° C. by the use of a Ubbelohde's viscometer, $\eta_o$ is a measured value of the same solvent having the same temperature by the use of the Ubbelohde's viscometer, and C is a concentration of 0.5 g/dl).

EXAMPLE 2

500 g of N,N-dimethylacetamide (hereinafter referred to as "DMAC"), 13.89 g (0.0559 mol) of 3,3'-diaminodiphenylsulfone and 18.02 g (0.0559 mol) of 3,3',4,4'-benzophenonetetracarboxylic acid dianhydride were mixed by the same device and the same procedure as in Example 1, and reaction was then carried out at a temperature of from 40 to 50° C for 10 hours to obtain a solution containing a polyamic acid having a logarithmic viscosity number of 0.33 dl/g. Afterward, 27.65 g (0.112 mol) of EEDQ was added to this solution, and reaction was then carried out at a temperature of from 20 to 30° C for 1 hour, whereby a carbon dioxide gas was generated vigorously and a yellow and transparent solution containing a polyisoimide having a logarithmic viscosity number of 0.48 dl/g was obtained. Silicon wafers were spin-coated with the obtained polyisoimide solution, and the solution of the wafers was dried at ordinary temperature under reduced pressure to form films thereon. For these films, infrared absorption spectra were measured, and an absorption was observed at 1800 cm$^{-1}$ and it was confirmed that the film was a polymer containing an isoimide group.

EXAMPLE 3

500 g of dimethylcarbitol, 25.11 g (0.0779 mol) of 3,3',4,4'-benzophenonetetracarboxylic acid dianhydride and 15.48 g (0.0623 mol) of 3,3'-diaminodiphenylsulfone and 14.96 g (0.0159 mol) of ω-ω'-bis(3-aminopropyl)-polydimethylsiloxane (molecular weight 960) were mixed by the same device and the same procedure as in Example 1, and reaction was then carried out at a temperature of from 30 to 40° C. for 10 hours to obtain a solution containing a polyamic acid having a logarithmic viscosity number of 0.47 dl/g. Afterward, 34.68 g (0.140 mol) of EEDQ was added to this solution, and reaction was then carried out at a temperature of from 40° to 50° C. for 3 hours, whereby carbon dioxide gas was generated vigorously and a yellow and transparent solution containing a polyisoimide having a logarithmic viscosity number of 0.52 dl/g was obtained. This solution was treated in the same manner as in Example 2 to form a film, and for this film, an infrared absorption spectrum was measured, and an absorption was observed at 1800 cm$^{-1}$ and it was confirmed that the film was a polymer containing an isoimide group.

EXAMPLE 4

500 g of dimethylcarbitol, 47.94 g (0.108 mol) of hexafluoroisopropylidene-2,2-bis(phthalic anhydride) and 40.30 g (0.0982 mol) of 2,2-bis[4-(aminophenoxy)-phenylhexafluoropropan] were mixed by the same device and the same procedure as in Example 1, and reaction was then carried out at a temperature of from 20° to 30° C. for 20 hours to obtain a solution containing a polyamic acid having a logarithmic viscosity number of 0.37 dl/g. Afterward, 46.14 g (0.187 mol) of EEDQ was added to this solution, and reaction was then carried out at a temperature of from 10° to 20° C. for 30 minutes, whereby carbon dioxide gas was generated vigorously and a yellow and transparent solution containing a polyisoimide having a logarithmic viscosity number of 0.46 dl/g was obtained. This solution was treated in the same manner as in Example 2 to form a film, and for this film, an infrared absorption spectrum was measured, so that an absorption was observed at 1800 cm$^{-1}$ and it was confirmed that the film was a polymer containing an isoimide group.

EXAMPLE 5

500 g of DMAC, 52.76 g (0.264 mol) of 4,4'-diamino diphenyl ether, 53.88 g (0.247 mol) of pyromellitic acid dianhydride and 4.89 g (0.033 mol) of phthalic anhydride were mixed by the same device and the same procedure as in Example 1, and reaction was then carried out at a temperature of from 20° to 30° C. for 5 hours to obtain a solution containing a polyamic acid having a logarithmic viscosity number of 0.69 dl/g. Afterward, 73.30 g (0.296 mol) of EEDQ was added to this solution, and reaction was then carried out at a temperature of from 30 to 40° C for 10 hours, whereby carbon dioxide gas was generated vigorously and a yellow and transparent solution containing a polyisoimide having a logarithmic viscosity number of 0.72 dl/g was obtained. This solution was treated in the same manner as in Example 2 to form a film, and for this film, an infrared absorption spectrum was measured, so that an absorption was observed at 1800 cm$^{-1}$ and it was confirmed that the film was a polymer containing an isoimide group.

EXAMPLE 6

500 g of NMP, 15.78 g (0.146 mol) of p-phenylenediamine, 1.94 g (0.0208 mol) of aniline and 50.35 g (0.156 mol) of 3,3',4,4'-benzophenonetetracarboxylic acid dianhydride were mixed by the same device and the same procedure as in Example 1, and reaction was then carried out at a temperature of from 30° to 40° C. for 20 hours to obtain a solution containing a polyamic acid having a logarithmic viscosity number of 0.63 dl/g. Afterward, 75.68 g (0.250 mol) of N-isobutoxycarbonyl-2-isobutoxy-1,2-dihydroquinoline was added to this solution, and reaction was then carried out at a temperature of from 10° to 20° C. for 2 hours, whereby carbon dioxide gas was generated vigorously and a yellow and transparent solution containing a polyisoimide having a logarithmic viscosity number of 0.68 dl/g was obtained. This solution was treated in the same manner as in Example 2 to form a film, and for this film, an infrared absorption spectrum was measured, so that an absorption was observed at 1800 cm$^{-1}$ and it was confirmed that the film was a polymer containing an isoimide group.

EXAMPLE 7

500 g of NMP, 93.24 g (0.301 mol) of 4,4'- oxydiphthalic acid anhydride, 6.55 g (0.0668 mol) of maleic anhydride and 66.86 g (0.334 mol) of 4,4'-diamino diphenyl ether were mixed by the same device and the same procedure as in Example 1, and reaction was then carried out at a temperature of from 20° to 30° C. for 10 hours to obtain a solution containing a polyamic acid having a logarithmic viscosity number of 0.41 dl/g. Afterward, 165.5 g (0.602 mol) of N-isobutoxycarbonyl-2-ethoxy-1,2-dihydroquinoline was added to this solution, and reaction was then carried out at a temperature of from 5° to 15° C. for 3 hours, whereby carbon dioxide gas was generated vigorously and a yellow and transparent solution containing a polyisoimide having a logarithmic viscosity number of 0.44 dl/g was obtained. This solution was treated in the same manner as in Example 2 to form a film, and for this film, an infrared absorption spectrum was measured, so that an absorption was observed at 1800 cm$^{-1}$ and it was confirmed that the film was a polymer containing an isoimide group.

What we claim is:

1. A process for producing a polyisoimide comprising dehydrating a polyamic acid by using a dihydroquinoline derivative represented by the formula $$\text{(1)}$$

[structure of dihydroquinoline with OR² and C(=O)OR¹ on nitrogen]

wherein each $R^1$ and $R^2$ is independently a monovalent organic group having 1 to 8 carbon atoms as dehydrating agent in producing the polyisoimide 2. A process for producing a polyisoimide comprising reacting a tetracarboxylic acid dianhydride with a diamine in an organic solvent to form a polyamic acid solution, and then adding to this solution a dihydroquinoline derivative represented by the formula $$\text{(1)}$$

[structure of dihydroquinoline with OR² and C(=O)OR¹ on nitrogen]

wherein each $R^1$ and $R^2$ is independently a monovalent organic group having 1 to 8 carbon atoms to carry out reaction.

3. A process for producing a polyisoimide according to claim 2 wherein said diamine is 4,4'-diamino diphenyl ether.

4. A process for producing a polyisoimide according to claim 2 wherein said diamine in p-phenylene diamine.

5. A process for producing a polyisoimide according to claim 2 wherein said diamine is ω,ω'-bis(3-aminopropyl) polydimethyl siloxane.

6. A process for producing a polyisoimide according to claim 2 wherein said diamine is 2,2-bis[4-(aminophenoxy)phenylhexafluoropropane.

7. A process for producing a polyisoimide according to claim 2 wherein said tetracarboxylic acid dianhydride is 4,4'-oxydiphthalic acid anhydride.

8. A process for producing a polyisoimide according to claim 2 wherein said tetracarboxylic acid dianhydride is pyromellitic acid dianhydride.

9. A process according to claim 1 wherein said dihydroquinoline derivative is N-isobutoxycarbonyl-2-isobutoxy-1,2-dihydroquinoline.

10. A process according to claim 1 wherein said dihydroquinoline derivative is N-isobutoxycarbonyl-2-isobutoxy-1,2-dihydroquinoline.

11. A process for producing apolyisoimide according to claim 1 wherein said dihydroquinoline is N-isobutoxyl carbonyl-2-ethoxide-1,2-hydroquinoline.

12. A process for producing a polyisoimide comprising reacting a polyamic acid represented by formula (2)

$$\text{+OC-R}^3\text{-CO-NH-R}^4\text{-NH}\frac{}{n}, \quad (2)$$
$$\text{HOOC} \quad \text{COOH}$$

with a dihydroquinoline derivative represented by formula (1)

$$\text{(1)}$$

[structure of dihydroquinoline with OR² and C(=O)OR¹ on nitrogen]

in a solvent at a temperature of 0–100°,
wherein each of $R^1$ and $R^2$ is independently a monovalent organic group having 1 to 8 carbon atoms, $R^3$ is a tetravalent organic group having 4 to 15 carbon atoms, $R^4$ is an organic group having 3 to 27 carbon atoms, or a group represented by the formula $$-R^7-\left[\begin{array}{c}R^5 \\ | \\ Si-O-Si \\ | \\ R^6 \end{array}\begin{array}{c}R^5 \\ | \\ \\ | \\ R^6\end{array}\right]_p-R^7-,$$

wherein $R^5$ and $R^6$ are independently methyl, ethyl or phenyl, $R^7$ is trimethylene, tetramethylene, phenylene or methylphenylene, P is 1 to 100 and n is a positive integer.

13. A process for producing a polyisoimide according to claim 12 wherein the polyamic acid represented by formula (2) is obtained by reacting a tetracarboxylic dianhydride with a diamine at a temperature of 0° to 50° C.

14. A process for preparing a polyisoimide according to claim 12 wherein $R^1$ and $R^2$ in the formula (1) are both ethyl groups.

15. A process for producing a polyisoimide according to claim 12 wherein the polyisoimide is represented by repetitive units of the formula

[repeating isoimide unit structure with R³ and R⁴]

16. A process for producing a polymer having repeating units of an isoimide represented by the formula

[repeating isoimide unit structure with R³ and R⁴]

and repeating units of an amic acid represented by the formula

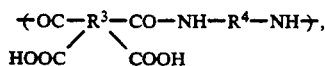

comprising reacting a tetracarboxylic acid dianhydride with a diamine in a solvent to form a solution of a polyamic acid represented by formula (2)

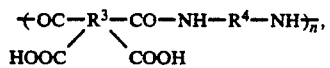 (2)

adding to the polyamic solution a dihydroquinoline derivative represented by formula (1)

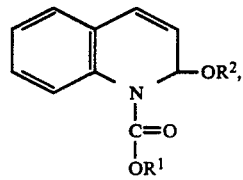 (1)

and carrying out a reaction at a temperature of 0-100° C.;

wherein each of $R^1$ and $R^2$ is independently a monovalent organic group having 1 to 8 carbon atoms, $R^3$ is a tetravalent organic group having 4 to 15 carbon atoms, $R^4$ is an organic group having 3 to 27 carbon atoms or a group represented by the formula

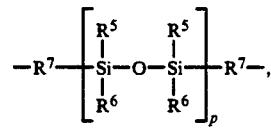

wherein $R^5$ and $R^6$ are independently methyl, ethyl or phenyl, $R^7$ is trimethylene, tetramethylene, phenylene or methylphenylene, P is 1 to 100 and n is a positive integer.

17. A process for producing a polyisoimide according to claim 12 wherein the polyamic acid represented by formula (2) is obtained by reacting a tetracarboxylic dianhydride with a diamine at a temperature of 0° to 50° C.

18. The method for preparing a polyisoimide according to claim 16 wherein $R^1$ and $R^2$ in the formula (1) are both ethyl groups.

* * * * *